United States Patent
Jochmann

[15] 3,683,682
[45] Aug. 15, 1972

[54] METHOD OF AND AN APPARATUS FOR DETERMINING THE BOND STRENGTH BETWEEN THE METALLIC SHEATH AND THE NON-METALLIC JACKET OF A CABLE

[72] Inventor: Leonhard Jochmann, Gigelesberg, Germany

[73] Assignee: International Standard Electric Corporation, New York, N.Y.

[22] Filed: July 24, 1970

[21] Appl. No.: 58,021

[30] Foreign Application Priority Data

Aug. 5, 1969 Germany..........P 19 39 836.8

[52] U.S. Cl. ................................73/88 B, 73/150 A
[51] Int. Cl. ..............................................G01n 19/04
[58] Field of Search .....73/150, 96, 103, 88 B, 150 A

[56] References Cited

UNITED STATES PATENTS

| | | | |
|---|---|---|---|
| 3,524,345 | 8/1970 | Isaacson | 73/150 |
| 3,019,644 | 2/1962 | Mancini | 73/96 |

*Primary Examiner*—Louis R. Prince
*Assistant Examiner*—Denis E. Corr
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The bond strength with which the aluminum sheath adheres to the polyethylene jacket of a cable is determined by measuring the force required to peel off the sheath from the jacket. The bond strength so measured provides an indication of the effectiveness of the bond as a moisture and vapor barrier. A simple measuring apparatus is clamped in a tensile strength testing machine to obtain a reading of the measured strength. The test piece is mounted in a rotatable collet having a split mandrel which clamps the aluminum sheath and peels it from the plastic. The torque on the mandrel is measured on the machine.

4 Claims, 6 Drawing Figures

INVENTOR
LEONHARD JOCHMANN 3,683,682

METHOD OF AND AN APPARATUS FOR DETERMINING THE BOND STRENGTH BETWEEN THE METALLIC SHEATH AND THE NON-METALLIC JACKET OF A CABLE

BACKGROUND OF THE INVENTION

1. Field of the Invention

This invention relates to a method of and an apparatus for determining the bond strength between a metallic sheath and non-metallic jacket of an electrical cable.

2. Description of the Prior Art

In electric cables provided with bonded jackets, a plastic-laminated metal foil is usually arranged between the cable core or the inner jacket, if any, and the outer jacket. For the manufacture of a bonded jacket, such a plastic-laminated metal foil is formed around the cable core, with the overlapping strip edges being closed, preferably welded to one another and the outer jacket being welded to the metal foil. The metal foil serves as electrical sheath for the cable core but more importantly as a water vapor barrier. The metal foil usually consists of aluminum and is covered, either on one or on both sides, with a firmly adhering layer of polyethylene or polyethylene copolymer.

Such bonded jackets are mainly used for cables, the core of which consists of paper-insulated conductors, because the plastics commonly used for cable jackets, such as polyethylene, are not water vapor diffusion-proof. Moisture penetrating into the paper insulation would rapidly reduce the insulation resistance of the conductors, thus rendering the cable useless. However, the bonded jacket offers the same advantages in cables with plastic-insulated conductors, particularly in those whose conductors are insulated with foamed plastics.

For cables with bonded jackets it is, therefore, of great importance that an accurate measurement is made on the bond strength between the jacket and the sheath as an indication of the quality of the water vapor barrier.

It has previously been attempted to determine the quality of the water vapor barrier by carrying out diffusion measurements on relatively short lengths of bonded jackets. But such a method has been found to be very complicated and time-consuming because of the small amounts of water vapor involved and their relatively slow speed of diffusion through plastics. Moreover, the measurements fail to indicate whether or not the diffusion is due to a locally limited leakage in the water vapor barrier or whether the entire water vapor barrier is badly connected to the cable jacket. Over the entire cable length, however, a local leakage would only cause a relatively minor deterioration of the barring property while bad bonding between a water vapor barrier and cable jacket would render the water vapor barrier ineffective over the entire cable length, thus rendering the cable useless.

It has been found that the better the quality of the water vapor barrier, the more firmly and completely the metal foil is bonded to the cable jacket. A further improvement of the barring effect is achieved by improving the quality of the sealing at the overlap of the water vapor barrier.

SUMMARY OF THE INVENTION

It is therefore an object of the present invention to provide a method of and an apparatus for ascertaining in a simple manner the quality of the water vapor barrier by determining the adhesion between metal sheath and cable jacket. A particular object is to provide a method of and an apparatus for determining the bond strength between a plastic laminated metal sheath and a plastic jacket of an electric cable in which the plastic jacket is extruded over the plastic laminated metal sheath.

In accordance with the present invention, the bond strength is determined by measuring the torque required to peel the metal sheath off along the entire circumference of the inside of the bonded jacket of a section of the cable serving as test piece. According to a feature of the invention, the test piece is placed into a freely rotatable collet which is positioned to surround the outer surface of the test piece. The collet is provided with a slitted mandrel which clamps one end of the metal sheath. The metal sheath is peeled off from the cable jacket by rotating the mandrel and winding the peeled sheath onto the mandrel, and during this operation the adhesion is measured.

The mandrel may be actuated in a simple manner by means of a torque screwdriver. However, it has proved particularly advantageous to actuate the mandrel by a tape or a cord wound thereon, with the support of the mandrel being clamped in the lower jaw of a tensile testing machine and the free end of the tape being clamped in the upper jaw thereof. The force exerted on the tape when the mandrel is rotated is then recorded by the recorder of a tensile testing machine.

For carrying out the method, an apparatus has proved useful which comprises a cup-shaped collet rotatably mounted on a baseplate by means of a pillow block and adapted to the outer diameter of the test piece, and a slitted mandrel which is arranged to project into the collet. The mandrel is provided with a winding drum and also is rotatably mounted in a pillow block.

Methods and apparatus according to the present invention will now be explained in more detail with reference to the accompanying drawings.

DETAILED DESCRIPTION OF THE INVENTION

Figure 1:
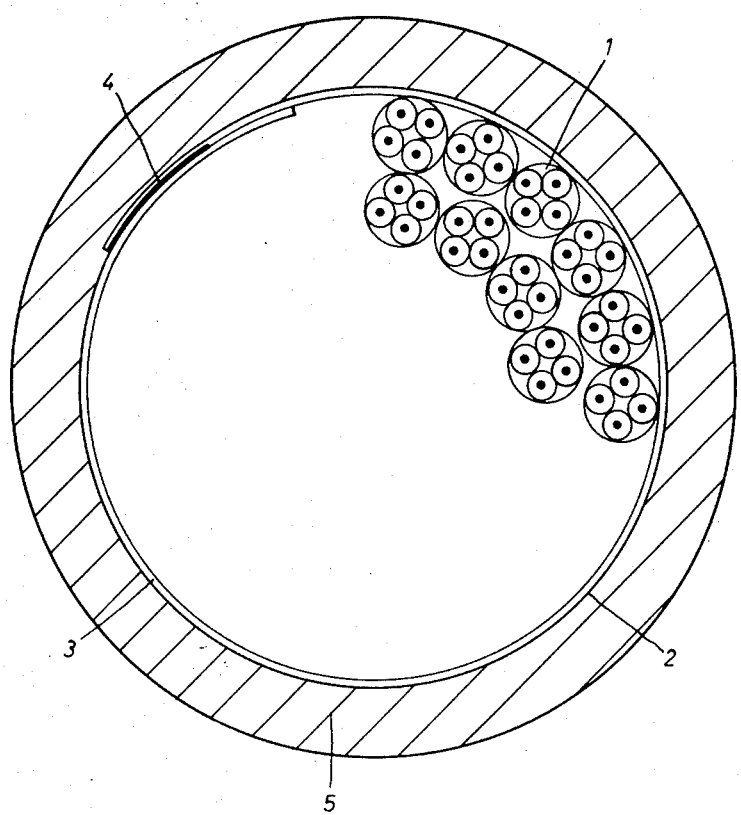
FIG. 1 is a cross section of a telephone cable with a bonded jacket showing a representative number of conductors.

As indicated in FIG. 1, the cable core 1 of the telephone cable with bonded jacket shown in a cross section is composed of a plurality of insulated conductors in groups of four commonly known as star quads. Placed around the entire cable core is an aluminum strip 3 coated on one side with plastic 2, whose edges lying one upon the other are welded together at the overlap 4. A plastic jacket 5 is extruded over this water vapor barrier, with the cable jacket also entering into a firm bond with the coated aluminum strip.

Figure 2:
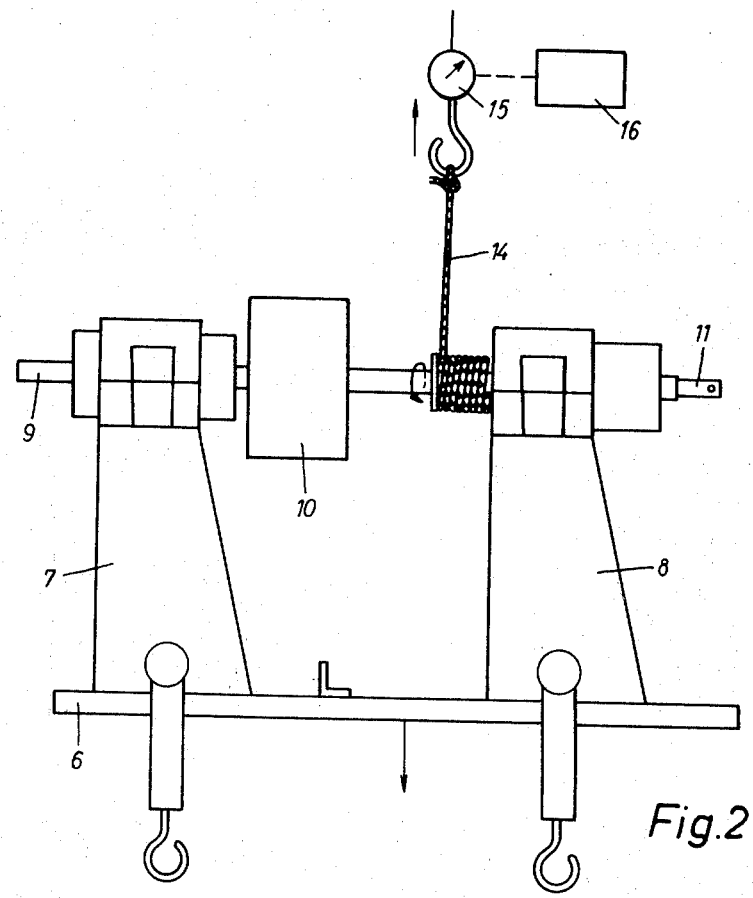
FIG. 2 is a side view of the measuring apparatus.

As will be apparent from FIG. 2, the measuring apparatus consists of a baseplate 6 on which are arranged the pillow blocks 7 and 8. In the pillow block 7, as FIG. 3 more clearly shows, an axle 9 is freely rotatably mounted in ball bearings, which axle carries on its right end the cup-shaped collet 10. In the pillow block 8 there is also rotatably mounted in ball bearings an axle 11 which on its left end terminates in a slitted mandrel 12 projecting into the collet. On the axle 11, there is also arranged a winding drum 13 on which is wound a rope or tape 14 which is capable of rotating the axle and the mandrel when a tensile force is exerted on its free end. The pillow blocks 7 and 8 and the axles 9 and 11 are slightly staggered in relation to each other.

Figure 3:
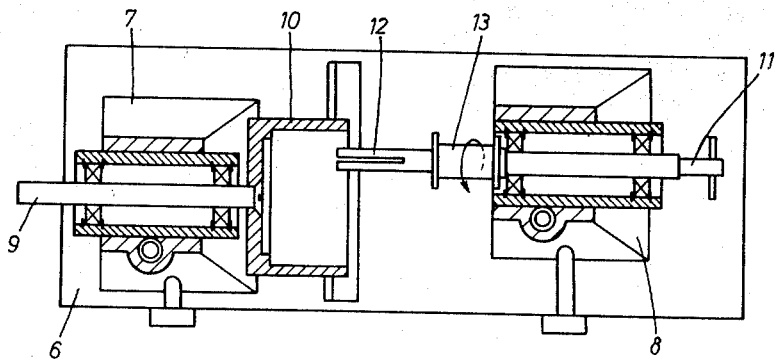
FIG. 3 is a partly sectionalized top view of the measuring apparatus.
Figure 4:
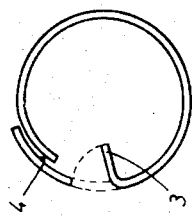
FIG. 4 shows details of the test piece and mandrel.

Using the apparatus illustrated in FIGS. 2 and 3, the method of determining the bond strength between metallic screen and cable jacket in a cable with a bonded jacket is carried out as follows: Several ring-shaped cable sections are cut out of the beginning and the end of the cable, as shown in FIG. 4 by way of example. This produces no additional cable scrap because at the beginning and the end of each cable the cable jacket must be removed anyway, in order to permit testing of the cable. For the manufacture of the test pieces, the ring-shaped cable jacket pieces are preferably cut out of the cable jacket in the direction of the overlapped portion by means of a circular saw for plastics, a jacket cutting device, or the like. The width of the ring should preferably be about 20 mm but may also be greater or smaller.

Figure 5:
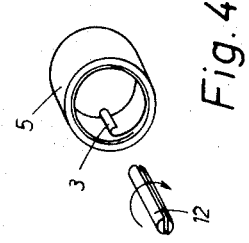
FIG. 5 is a schematic representation of a differently prepared test piece.

After the cut edges of the test piece have been carefully deburred, it is suitably clamped in the collet 10 which is adapted to the outer diameter of the cable, with the test piece being placed into the interior space of the cup. Then the aluminum strip 3 is suitably clamped in the slitted mandrel 12, at the overlap as shown in FIG. 4, or immediately behind the overlap as shown in FIG. 5. According to the latter arrangement, the aluminum strip is cut through behind the overlap and about 8 mm of it are detached over the entire ring width. This has the advantage that, at the end of the measuring operation, the weld at the overlap is tested at a constant peeling-off speed whereby exact measurement and recording is insured.

In each case, however, the end of the aluminum strip, which has been clamped in the slitted mandrel, is peeled off the jacket material and wound on the mandrel. The spacing between the mandrel 12 and the inner surface of the collet 10 is chosen so that, during the measurement, no friction occurs between the peeled-off aluminum strip and the inner surface of the cable jacket.

The torque during the rotation of the mandrel and during the peeling-off of the aluminum strip could be applied to the axle 11 in a simple manner by means of a torque screwdriver. However, the apparatus with the winding drum 13 and the cord wound thereon, as shown in FIGS. 2 and 3, has proved more advantageous. Here, the baseplate 6 is clamped in the lower jaw of a tensile testing machine and the cord 14 is clamped in the upper jaw thereof. By unwinding the cord at a speed of about 100 mm/min., the mandrel is rotated and the aluminum strip peeled off. The force indicated by a suitable measuring device 15 on the tensile testing machine is then directly proportional to the adhesion between aluminum strip and cable jacket. The measured value must only be converted to the respective ring width of the test piece.

Figure 6:
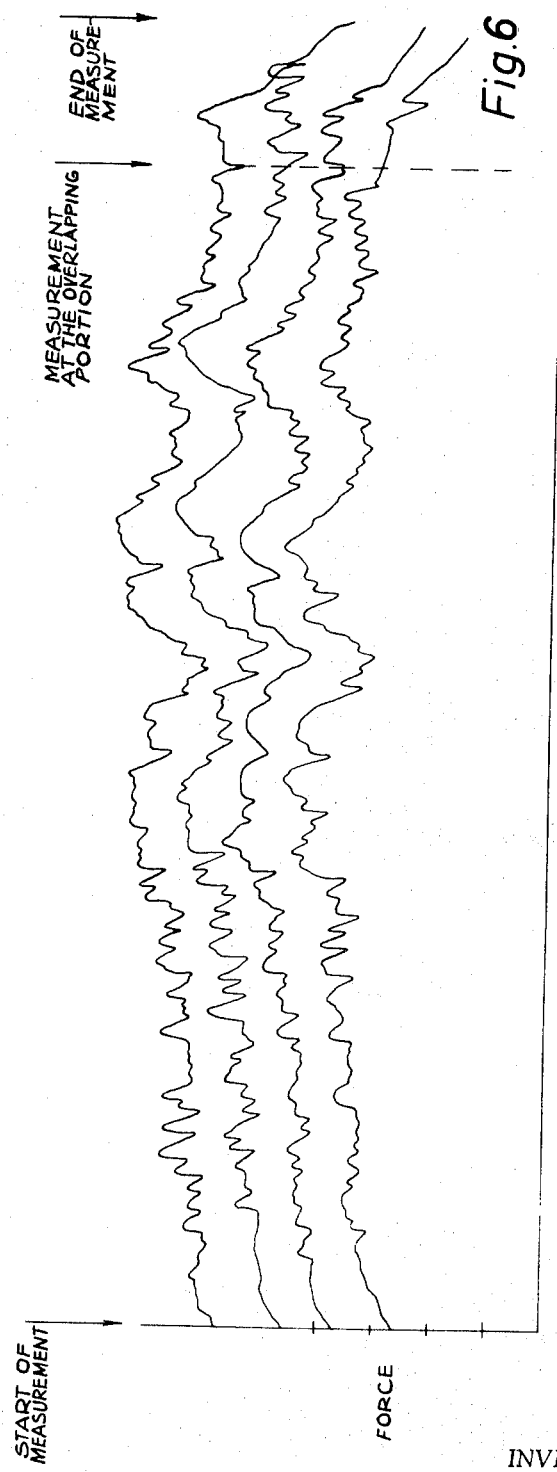
FIG. 6 shows a diagram made by the measuring apparatus.

The force indicated by the tensile testing machine can also be recorded by the recorder 16 of the tensile testing machine so that the measured result can subsequently be evaluated. In this case, as illustrated in FIG. 6, the force measured by the tensile testing machine (ordinate) is plotted against the circumference (abscissa) for different test pieces which were originally lying side by side in the cable jacket. On the ordinate, one centimeter is equivalent to the force of 1 kg/cm. Each of the abscissas of the various measurements, however, are translated by one centimeter, so that the diagrams are not written one upon the other. In this manner, a similarity in the diagrams of all measurements can be clearly recognized. The torque required for peeling off the strip is $M_D = F \cdot r$, wherein $M_D =$ torque, $F =$ adhesion of the aluminum strip to the cable jacket, and $r =$ mandrel radius. If, in the arrangement according to FIGS. 2 and 3, the radius of the mandrels 12 is assumed to be $r_1$, the radius of the winding drum $r_2$ and the force measured on the tensile testing machine $F_2$, the adhesion $F_1$ will be: $F_1 = F_2 r_2/r_1$.

Thus, a comparison of the measuring diagrams for test pieces taken from the beginning and the end of a cable according to the method described permits qualitative conclusions to be drawn with respect to the water vapor diffusion tightness of the entire cable length. Such a measurement can be carried out more rapidly and at a lower cost than a measurement of diffusion.

What is claimed is:

1. An apparatus for measuring the bond strength of a metallic sheath bonded onto a non-metallic jacket of an electrical cable, said sheath having two longitudinal edges forming a seam, comprising:

a base frame;

a first and a second support means mounted on said base frame;

a first axle freely and rotatably mounted on said first support means;

means coupled to said first axle for holding a tubular portion of said sheath and jacket;

a second axle freely and rotatably mounted on said second support means, said second axle being offset from and aligned in parallel with said first axle;

a slitted mandrel coupled to said second axle and aligned with the axis thereof and facing said holding means, said slitted mandrel clamping one of said two edges of said sheath forming said seam;

means for applying a torque to said second axle for enabling said mandrel to peel off said sheath from said jacket; and means for measuring the torque required to rotate said second axle and the bond strength between said sheath and said jacket.

2. The apparatus in accordance with claim 1, wherein said means applying a torque includes cord means, one end of which is attached to and wrapped about said second axle, means for pulling the other end of said cord means to apply torque to said mandrel.

3. The apparatus in accordance with claim 2 further including recording means coupled to said measuring means for recording said torque with respect to the circumference of said sheath.

4. An apparatus for measuring the bond strength of a metallic tubular layer bonded onto a tubular insulation layer comprising:

support means;

a mandrel rotatably mounted on one side of said support means;

means for holding a selected portion of said metallic tubular layer bonded onto said tubular insulation layer, said holding means being rotatably mounted on the other side of said support means, the axis of said holding means being parallel to and offset from the axis of said mandrel with an end of said mandrel extending over a portion of said holding means;

means for securing one of said layers to said mandrel for rotation with respect to the other layer;

means for applying a torque to said mandrel to peel said one layer from said other layer; and means for measuring said torque and the corresponding bond strength between said layers.

* * * * *